(12) United States Patent
Piesslinger-Schweiger

(10) Patent No.: US 6,565,756 B2
(45) Date of Patent: May 20, 2003

(54) METHOD FOR THE CONDITIONING OF PHOSPHORIC ACID

(75) Inventor: Siegfried Piesslinger-Schweiger, Vaterstetten (DE)

(73) Assignee: Poligrat Holding GmbH (DE)

( * ) Notice: Subject to any disclaimer, the term of this patent is extended or adjusted under 35 U.S.C. 154(b) by 79 days.

(21) Appl. No.: 09/870,196

(22) Filed: May 30, 2001

(65) Prior Publication Data

US 2001/0034926 A1 Nov. 1, 2001

Related U.S. Application Data

(62) Division of application No. 09/074,430, filed on May 7, 1998, now Pat. No. 6,264,177, which is a continuation of application No. PCT/EP96/04891, filed on Nov. 7, 1996.

(30) Foreign Application Priority Data

Nov. 7, 1995 (DE) .......................... 195 41 479
Nov. 7, 1996 (WO) ................. PCT/EP96/04891

(51) Int. Cl.[7] ............................. C01B 25/30; C02F 1/00
(52) U.S. Cl. ................ 210/724; 210/906; 423/309; 423/311; 423/313; 423/DIG. 1; 423/DIG. 2
(58) Field of Search ................ 210/705, 724, 210/906; 423/313, 305, 311, 306, 309; 588/252; 71/34

(56) References Cited

U.S. PATENT DOCUMENTS

| 1,213,887 A | 1/1917 | Krause | ...................... 261/79.2 |
| 1,451,063 A | 4/1923 | Anthony | .................... 261/79.2 |

(List continued on next page.)

FOREIGN PATENT DOCUMENTS

| DE | 2130309 | 12/1972 |
| DE | 2426641 | 12/1974 |
| DE | 2452061 B2 | 5/1976 |
| DE | 3790211 T1 | 7/1988 |
| DE | 3908125 A1 | 9/1990 |
| JP | 51-088856 A | * 8/1976 | ........... B01D/21/01 |

OTHER PUBLICATIONS

Hammer et al, Water and Wastewater Technology, Third Edition, 1996. pp. 470–475.*

Derwent Publications, Ltd.; London, Great Britain, AN88–216171; XP002024890 & JP, A, 63 151 398 (EBARA INFILCO) Jun. 23, 1988, siehe Zusammenfassung, Database WPI Week 8831.

International Search Report for PCT/EP96/04891.

Primary Examiner—Stanley S. Silverman
Assistant Examiner—Maribel Medina
(74) Attorney, Agent, or Firm—Wood, Herron & Evans, L.L.P.

(57) ABSTRACT

A method for the conditioning of phosphoric acid containing solutions is described, wherein the solution is converted to a solid material by adding an aluminum compound. This solid material can readily be stored in disposal sites because it is not water-soluble. This method is particularly suited for the conditioning of phosphoric acid containing solutions from metal processing. An apparatus (10) for carrying out the method comprises a mixing tube (12) with a longitudinal axis (M) as well as an inlet (14) and an outlet (16). At least two liquid supply nozzles (18 and 20) opens into the mixing tube inlet (14) and, with respect to the inlet cross-sectional area of same, into a central area. Moreover, at least one gas supply nozzle (22) which is arranged radially outward of the liquid supply nozzles (18 and 22) opens into the mixing tube inlet (14). The longitudinal axis (G) of each gas supply nozzle (22) is inclined relative to the longitudinal centre axis (M) in such manner that said axes do not intersect. The angle between each longitudinal axis (G) and the longitudinal centre axis (M) amounts to at least 5°.

37 Claims, 1 Drawing Sheet

U.S. PATENT DOCUMENTS

| | | | |
|---|---|---|---|
| 2,886,297 A | 5/1959 | Crandall | 261/79.2 |
| 3,324,632 A | 6/1967 | Berneike et al. | 261/79.2 |
| 3,761,065 A | 9/1973 | Rich et al. | 261/79.2 |
| 3,844,721 A | 10/1974 | Cariou et al. | 261/79.2 |
| 3,963,637 A | 6/1976 | Chappell | 252/181 |
| 3,980,558 A | 9/1976 | Thompson | 210/59 |
| 4,014,961 A | 3/1977 | Popov | 261/79.2 |
| 4,049,462 A | 9/1977 | Cocozza | 106/85 |
| 4,402,750 A | 9/1983 | Okamura et al. | 106/85 |
| 4,505,851 A | 3/1985 | Funabashi et al. | 252/628 |
| 4,507,207 A * | 3/1985 | Verhoave et al. | 210/714 |
| 4,547,290 A | 10/1985 | Pichat | |
| 4,549,985 A | 10/1985 | Elliott | 252/631 |
| 5,422,015 A | 6/1995 | Angell et al. | 210/751 |
| 5,463,171 A | 10/1995 | Nishi et al. | 588/4 |
| 5,525,242 A | 6/1996 | Kerecz | 261/79.2 |
| 5,624,609 A | 4/1997 | Serres et al. | 261/79.2 |
| 5,705,132 A | 1/1998 | Maupin et al. | 261/79.2 |
| 5,732,363 A | 3/1998 | Suzuki et al. | 588/4 |

\* cited by examiner

METHOD FOR THE CONDITIONING OF PHOSPHORIC ACID

This is a divisional application of U.S. application Ser. No. 09/074,430, filed on May 7, 1998 now U.S. Pat. No. 6,264,177, which is a continuation of PCT/EP96/04891, filed Nov. 7, 1996, which claims priority to German Application No. 195 41 479.9, filed Nov. 7, 1995.

FIELD OF THE INVENTION

The invention relates to a method and an apparatus for the conditioning of phosphoric acid and in particular of mixtures containing phosphoric acid.

BACKGROUND

Phosphoric acid and mixtures of phosphoric acid and other acids such as sulphuric acid are formed in large quantities in the processing of metallic surfaces.

Metal surfaces are often cleaned, pickled, electropolished and decontaminated by means of phosphoric acid in its pure form or in the form of a mixture with other mineral acids, e.g. sulphuric acid. For this purpose, it is employed both concentrated as well as in any degree of dilution, both chemically (currentless) as well as electrochemically with the application of current. The objective of the processing is the cleaning of the metal surfaces by removing contaminations or contaminated material layers. To a large extent, the removed material and the contaminants contained therein are dissolved and concentrated in the acid. After processing, the metal surfaces are cleaned from the adhering acid residues by rinsing under water and dried. The resulting rinsing water contains residues of the acids as well as metal ions and contaminants dissolved therein.

With an increasing metal content, the acids and acid mixtures undergo a decreasing effectiveness and must therefore be replaced completely or partially by fresh acid. The thus occurring waste acid and the rinsing water must be conditioned in such a manner that they can be disposed of in an environmentally harmless way. The dissolved heavy metals, in particular, must be converted to solids which are suitable for deposition. Such solids should be neutral to slightly alkaline and must not, or may only slightly be, water soluble.

According to the state of the art the conditioning or phosphoric acid and mixtures of phosphoric acid, which are contaminated as described is performed by dilution with water followed by a neutralisation by means of bases, in particular calcium hydroxide, and by precipitation of the formed salts and metal hydroxides. Subsequently, the solids are separated from the water by sedimentation and filtration, thickened and deposited in special waste dumps or sites. The remaining water contains, in a reduced concentration, the contaminants which were originally included in the acid and is discharged to the environment, provided the contaminant concentration does not exceed the currently valid limits, or is recycled to be partially reused. In most cases, however, the total of the waste solids to be deposited represent a multiple of the acid to be conditioned.

Another possibility for the regeneration of mixtures containing phosphoric acid is the recovery of the phosphoric acid by liquid—liquid extraction and its subsequent reuse. This, however, still leaves the problem of an environmentally compatible conditioning of the remaining residual and waste materials. Moreover, this method necessitates sophisticated and expensive equipment.

In the treatment of radioactively contaminated metal surfaces by means of phosphoric acid and phosphoric acid mixtures the above mentioned methods have serious drawbacks because the acids and the rinsing water themselves which are used in the conditioning will subsequently be radioactively contaminated.

It is obvious that the radioactive contaminants contained in the acids and rinsing water must not be discharged to the environment in a free condition, but must be completely transferred to solids and to an immobilized condition for disposal in a terminal store for radioactive waste. This means that in practice these waste materials must be expensively conditioned in a separate process prior to storage by encasing them in concrete or in bitumen, fixing them in ion exchangers or encasing them in glass, which again results in a considerable volume increase. The available space for the deposition of radioactive waste, however, is limited and the associated costs are extremely high.

The problems with respect to a conditioning method which is capable of meeting the relevant requirements of the waste liquids as they occur in the electrochemical or chemical decontamination of metal surfaces by means of phosphoric acid or its mixtures could yet not be solved satisfactorily. For this reason, chemical and electrochemical decontamination methods by means of phosphoric acid or its mixtures are employed very rarely despite of their high effectiveness and simple handling.

From DE 39 08 125 A1 a method is known, wherein residues from industrial manufacturing processes and in particular residues from combustion plants are solidified. The solidified products can be stored in dump sites or used as construction materials. This documents states that a mixture from alkali silicate and alkali aluminate can be used as a binding agent for the purpose of solidifying the residues, which is added in a solid condition or, if required, as an aqueous solution. According to all examples, the residues concerned are substantially dusts (i.e. flue dust) from combustion plants.

SUMMARY OF THE INVENTION

The object of the present invention is to provide a method for the direct and complete transformation of the waste acids and rinsing water including any contaminants contained therein whereby solids suitable for deposition are formed so that compared to the state of the art a significant increase of the volume of the waste acid etc. is prevented and no particularly sophisticated means and equipment are necessary which themselves can become contaminated.

According to the invention this object is solved by a method, wherein aluminum containing alkaline solutions of a quantity sufficient for the formation of solids are added to the mixtures containing phosphoric acid, as they are obtained by the processing of metal surfaces. Surprisingly, it was found that the obtained solids are essentially water insoluble and can therefore be readily deposited in disposal sites.

DETAILED DESCRIPTION

Figure 1:
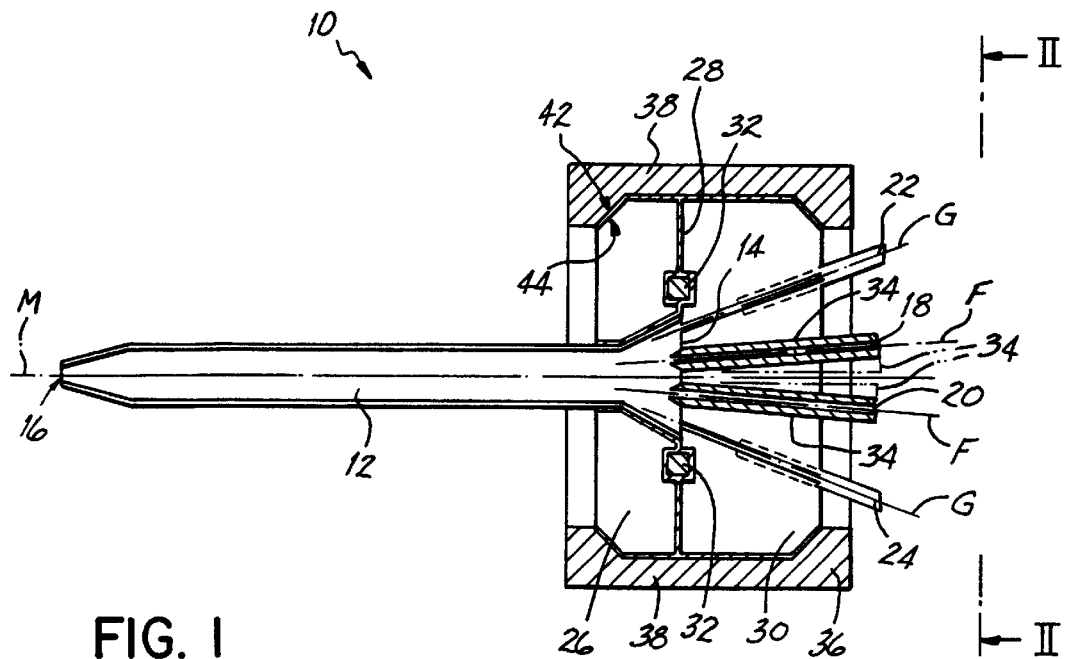
FIG. 1 shows a longitudinal section through an inventive mixing apparatus along line I—I in FIG. 2.

The invention is a method for conditioning and solidification of solutions containing phosphoric acid, in particular from the precessing of metal surfaces, wherein the solutions which have a phosphoric acid content from 10 to 100% by weight are mixed with alkaline aluminum containing solutions which have an aluminum content of 1.5 to 20% by weight, preferably from 4 to 10% by weight, are mixed in such a proportion that a pH value ranging from 5 to 9 is achieved.

In the practical implementation of the present invention it was found advantageous to maintain certain limiting concentrations. Simultaneously, the pH value is to be adjusted in such a manner that it ranges from pH 9 to pH 5, preferably from pH 8 to pH 6, and more preferably from pH 7 to pH 8 in the gradually solidifying mixture. It was found advantageous to use solutions with an aluminum content from 4 to 10% by weight. This means that in the eventually obtained mixture of phosphoric acid or phosphoric acid mixtures and solutions containing aluminum the aluminum concentration amounts to at least approximately 1.5% by weight. Preferred aluminum concentrations are 4 to 8% by weight. A phosphoric acid concentration of 40 to 70% by weight has proven to be advantageous. The phosphoric acid solution can also already have an aluminum content in the order of 0 to 4% by weight.

It was found that phosphoric acid containing acid mixtures as they are formed in the chemical or electrochemical pickling, cleaning or polishing are mixtures particularly suited for the inventive method, but in particular also such acid mixtures which are used for the decontamination of metal surfaces. Such mixtures contain also sulphuric acid besides the phosphoric acid with a concentration of to 70% by weight. The concentration of the sulphuric acid preferably ranges from 15 to 50% by weight. An aluminum containing solution which is particularly suitable for carrying out the method would be an aqueous solution of alkaline hydroxides with a concentration of 1 to 60% by weight, preferably with an alkali hydroxide content of 10 to 40% by weight.

A very special advantage of the present invention is that waste solutions from various metal treatments, where acidic phosphoric acid containing mixtures are formed on the one hand an d aluminum containing solutions on the other hand, can readily be prepared for disposal. Upon mixing these waste solutions, a highly viscous mass is obtained first which gradually cures to a solid substance, provided the above threshold values are reasonably observed. The viscous mass can still be filled into barrels and without any further treatment be deposited on dump sites. In this process neither aerosols nor dusts are formed, which is of particular importance in the case of radioactively contaminated waste solutions.

The correct volume proportions and concentrations of phosphates and aluminum ions must be established, if necessary, by means of simple tests. If required, alkaline earth metal ions, such as $Ca^{++}$, may be added, for example in the form of calcium aluminate. The concentration of the alkaline earth metals is preferably within the same range as the aluminum concentration. Calcium aluminate is preferably used.

According to the inventive method the acids or acid mixtures to be conditioned are converted, by the addition of an alkaline aluminum containing solution, to solids which are insoluble in water and which have the capability to bind substantial quantities of foreign matter and water. The water is bound as water of crystallisation. The water binding capacity is enhanced if prior to conditioning, aluminum ions are added to the phosphoric acid or the phosphoric acid mixture. This can be effected by means of chemical or anodic dissolution.

Suitable additives for the solidification are calcium aluminate, sodium aluminate and potassium aluminate or mixtures thereof.

The conditioning is performed as follows:
1. In the case of a very high water content of the phosphoric acid or the acid mixture containing phosphoric acid to be treated, it is first concentrated to a concentration suitable for the inventive method by evaporating water, and then enriched with aluminum ions. This can be done, for example, by anodic dissolution of aluminum. An aluminum concentration of more than 1.5% by weight has proven to be advantageous.
2. Enriching a sodium hydroxide or potassium hydroxide solution with aluminum up to saturation.
3. Adding the aluminum containing alkaline solution until pH 8 is reached.

Depending on the aluminum concentration, the phosphate content and the water content in the mixture, the latter will solidify within a period of a few seconds up to half an hour to form a mineral substance. The time to solidification can be selected by controlling the water content of the mixture in such a manner that it can be filled into containers, e.g. barrels. The pH value is preferably to be adjusted within the range from pH 7 to pH 8. With a low water content or a high aluminum content in conjunction with a high phosphate content, the solidification can occur already at lower pH values.

The reaction may be highly exothermal. The temperature can advantageously be controlled by the rate with which the components are added. Excess water may be evaporated to a certain degree by heating caused by the reaction. The water content and thus the weight of the solidified mixture may subsequently be further reduced by heating.

In addition to pure phosphoric acid, the method was employed for mixtures of phosphoric acid and sulphuric acid. It was found that it can be employed up to a mixing ratio of phosphoric to sulphuric acid of 1:3.

The water quantity that can be bound as water of crystallisation depends on the quantity of phosphoric acid which is present in the mixture. In the case of an excessive water content the acid mixtures are to be concentrated prior to conditioning by evaporation. In this case, not only the proportion of free water has to be considered, but also the water quantity in the alkaline solution and the quantity which will be liberated upon the neutralisation of the acid.

It was found that the leaching resistance (according to DIN 38414) of the solid substance obtained by the present method is altogether high.

For the processing of aluminum, it is suggested to perform the metal removal in a first processing step by pickling in a sodium or potassium hydroxide solution and thereby remove any existing oxide layers. The second step comprises electropolishing in a phosphoric acid or a phosphoric/sulphuric acid electrolyte. Both processing solutions can be directly conditioned by mixing without any further additives upon reaching an increased aluminum concentration by means of the method according to the invention, with the rinsing water as obtained in the process to be included in the conditioning after concentration by evaporation.

In the processing of other metals, such as steel, high-grade steel, nickel, copper and beryllium, the quantity of aluminum which is required for the conditioning is to be subsequently added to the acid mixture. The heavy metals in the mixture do not interfere with the conditioning.

EXAMPLES FOR THE CONDITIONING

The following mixtures were used:
Mixture A:
  50% by weight phosphoric acid (85%) and 46% by weight sulphuric acid (96%) with approximately 4.3% by weight iron; 1.1% by weight chromium; 0.5% by weight nickel, as well as traces of molybdenum, copper, lead, titanium et al.; density at 20° C.: 1.801 $g/cm^3$.
Mixture B:
  50% by weight phosphoric acid (85%) and 46% by weight sulphuric acid (96%) with approximately 3.5% by weight iron; 0.9% by weight chromium; 0.4% by weight nickel and 2.4% by weight aluminum; density at 20° C.: 1.821 $g/cm^3$.
Mixture C:

Sodium hydroxide solution, 25% by weight, enriched with 7.2% by weight aluminum; density at 20° C.: 1.406 g/cm³.

Mixture D:

Potassium hydroxide solution, 30% by weight, enriched with 5.4% by weight aluminum; density at 20° C.: 1.491 g/cm³.

Example 1 a) Provision of 20 g of mixture A b) Addition of 25.7 g of mixture D until pH 7 is reached. The mixture solidifies. Its water content is 40.8%.

Leaching test to DIN 38414 (1 g in 1 l of completely softened water):

| | |
|---|---|
| pH value: | 6.55 |
| Conductivity: | 643 mS/cm |
| Fe: | 0.20 mg/l |
| Cr: | 0.04 mg/l |
| Ni: | 0.34 mg/l |

Example 2 a) Provision of 20 g of mixture A b) Addition of 22.9 g of mixture C until pH 7 is reached. The mixture solidifies. Its water content is 45.3%.

Leaching test to DIN 38414:

| | |
|---|---|
| pH value: | 6.84 |
| Conductivity: | 678 mS/cm |
| Fe: | 0.13 mg/l |
| Cr: | 0.02 mg/l |
| Ni: | 0.22 mg/l |

Example 3 a) Provision of 20 g consisting of 75% by weight of mixture A and 25% by weight of water b) Addition of 3 g calcium aluminate c) Addition of 16,6 g of mixture D until pH 7 is reached. The mixture solidifies. Its water content is 43.4%.

Leaching test to DIN 38414:

| | |
|---|---|
| pH value: | 6.85 |
| Conductivity: | 604 mS/cm |
| Fe: | 0.04 mg/l |
| Cr: | 0.01 mg/l |
| Ni: | 0.46 mg/l |
| Sulfate: | 201.4 mg/l |
| Phosphate: | 25.0 mg/l |

Example 4 a) Provision of 20 g of mixture B b) Addition of 23.9 g of mixture D until pH 7 is reached. The mixture solidifies. Its water content is 40.3%.

Leaching test to DIN 38414:

| | |
|---|---|
| pH value: | 6.23 |
| Conductivity: | 582 mS/cm |
| Fe: | n.n. |
| Cr: | 0.02 mg/l |
| Ni: | 0.40 mg/l |
| Sulfate: | 207.9 mg/l |
| Phosphate: | 13.98 mg/l |

Example 5 a) Provision of 20 g of mixture B b) Addition of 24.4 g of mixture C until pH 7 is reached. The mixture solidifies. Its water content is 45.2%.

Leaching test to DIN 38414:

| | |
|---|---|
| pH value: | 6.48 |
| Conductivity: | 655 mS/cm |
| Fe: | 0.08 mg/l |
| Cr: | 0.02 mg/l |
| Ni: | 0.41 mg/l |
| Sulfate: | 286.4 mg/l |
| Phosphate: | 7.52 mg/l |

Example 6 a) Provision of 20 g consisting of 50% mixture B and 50% water b) Addition of 3 g calcium aluminate c) Addition of 8.1 g of mixture D until pH 7 is reached. The mixture solidifies. Its water content is 50.64%.

Leaching test to DIN 38414:

| | |
|---|---|
| pH value: | 5.56 |
| Conductivity: | 569 mS/cm |
| Fe: | 0.10 mg/l |
| Cr: | 0.02 mg/l |
| Ni: | 0.52 mg/l |
| Sulfate: | 255.2 mg/l |
| Phosphate: | 7.67 mg/l |

As can be seen, the solidification of the acid mixture according to the inventive method, even without the possible subsequent reduction of the water content, already results in a weight increase of a maximum of 1.5 times the weight of the acid mixture. The conventional method of conditioning the acid mixtures by neutralizing them first without the addition of aluminum ions and then by solidifying them by concrete encasing, on the other hand, results in a weight increase by a factor 12 to 20 depending on the used neutralization agent.

In the following, an apparatus will be described which is particularly well suited for carrying out the above inventive method. This apparatus comprises a mixing tube which extends along a longitudinal centre axis and which has an inlet as well as an outlet, with the outlet being preferably arranged opposite the inlet. At least two liquid supply nozzles and at least one gas supply nozzle open into the inlet of the mixing tube. The liquid supply nozzles open into a central area of the inlet with respect to the inlet cross section, while the at least one gas supply nozzle opens radially outward from the at least two liquid supply nozzles into the inlet near the inner wall of the mixing tube. The longitudinal axis of the mixing tube is inclined in such a manner that the angle between the longitudinal axis of the gas supply nozzle and the longitudinal centre axis of the mixing tube is at least 5°, with the longitudinal axis of the gas supply nozzle not intersecting the longitudinal centre axis of the mixing tube. The gas supply nozzle thus injects tangentially into the mixing tube with respect to the inner wall of the mixing tube.

In an apparatus of this type, the phosphoric acid containing solution is supplied through the one liquid supply nozzle and the alkaline aluminum containing solution is supplied through the other liquid supply nozzle into the mixing tube. The at least one gas supply nozzle serves to inject a gas, for example, compressed air, into the area of the inner wall of the mixing tube and tangentially to the longitudinal centre axis of the mixing tube so that the gas flows in a helical manner through the mixing tube. The resulting swirl of the gas stream in the mixing tube provides for separating the metered liquids which are injected into the core area of the mixing tube into drops, for their homogeneous mixing and transport toward the outlet of the mixing tube. The heat which is generated upon the reaction of the two injected liquids and the resulting steam are entrained by the gas stream and discharged in a controlled manner. Due to the swirling action in the mixing tube, the solid which is generated by the reaction takes the form of a granular material which is ejected from the mixing tube inner wall to a considerable degree. AN objection of the mixing tube is therefore prevented and the resulting solids can be packaged in a simple manner.

The inventive mixing apparatus ensures a controlled, continuous and stable mixing operation which yields a consistent product quality and a uniform product output. Though its performance is high, it is of small size, can be handled conveniently and its reliability is excellent. Moreover, its manufacture is cost effective, it is nearly maintenance-free and requires low operating costs because only relatively small amounts of compressed gas and electricity to drive the liquid metering pumps are required. The liquid metering pumps need not be expensive high pressure pumps, metering pumps which operate in a relatively low pressure range are sufficient.

According to a preferred embodiment of the inventive mixing apparatus two gas supply nozzles open into the mixing tube inlet, with the angle between the longitudinal axis of each gas supply nozzle and the longitudinal centre axis of the mixing tube ranging from 5° to 60°. If several gas supply nozzles are provided these open into different quadrants relating to the preferably circular inlet cross section of the mixing tube. If two gas supply nozzles are provided, these open preferably into diametrically opposed quadrants of the inlet cross section.

It is also advantageous that each gas supply nozzle opens slightly upstream of the liquid supply nozzles into the inlet of the mixing tube. The term inlet herein refers to an axially extending area at the inlet end of the mixing tube.

The previously mentioned provisions result in an even better and more uniform mixing of the injected liquids. With several gas supply nozzles provided, there will be an advantageous effect if these open into different circumferential locations of the inlet cross section. In each case, however, the gas supply nozzles are positioned radially outward from the liquid supply nozzles and arranged in such a manner that the injected gas stream exits tangentially with respect to the longitudinal centre axis of the mixing tube so that a spiral-shaped or helical stream passes through the mixing tube.

The liquid supply nozzles the number of which depends on the number of liquids to be mixed can be arranged in such a manner that their longitudinal axes extend parallel or under a slight inclination with respect to the longitudinal centre axis of the mixing tube so as to intersect the longitudinal centre axis in the mixing tube. The inclination of the liquid supply nozzles with respect to the longitudinal centre axis of the mixing tube is preferably smaller than the corresponding inclination of each gas supply nozzle.

In all embodiments of the inventive mixing apparatus the inlet area of the mixing tube is preferably expanded conically. This provides for sufficient space for the supply of the various components, and moreover it generates a desired suction effect in the flow direction due to the reduction of the flow cross sectional area.

In an advantageous constructional design of the inventive mixing apparatus the mixing tube penetrates a preferably circular support plate in which the mixing tube is positively supported. Provided the inlet area of the mixing tube is conically expanded as described above the mixing tube need only be placed in a correspondingly formed recess of the support plate in which it will centre itself. The inlet end of the mixing tube is in alignment with the associated surface of the support plate.

According to a further embodiment the liquid supply nozzles and each gas supply nozzle are formed or at least accommodated in a cylindrical nozzle block which is placed upon the above described support plate and clamped to it. The gas supply nozzles and the liquid supply nozzles can, for example, be formed directly in the nozzle block material by an electrical discharge machining method, alternatively, prefabricated nozzles can be installed in corresponding holes of the nozzle block. If necessary, a seal is arranged between the support plate and the nozzle block. A mixing apparatus constructed in this manner is very solid but compact and offers easy disassembly and cleaning.

The clamping of the support plate with the cylindrical nozzle block can, for example, be effected by means of a circular clamp which surrounds the support plate and the nozzle block in a circumferential direction. The circumferential surfaces of holding plate and nozzle block and the inner circumferential surface of the clamp can be designed in a known manner such that correspondingly inclined surfaces exert an increasing axial force on the support plate and the nozzle block upon tightening the clamp, which increasingly forces the latter two parts against each other.

The inventive mixing apparatus has been described with reference to mixing a highly concentrated phosphoric acid containing liquid with an alkaline aluminum containing solution. It is, however, not limited to this application, but is also suited for mixing many liquids, in particular, for mixing such liquids where a violent and highly exothermal reaction takes place upon mixing and where, as a result of this mixing operation, a solid matter is formed almost momentarily. Conventional static and dynamic mixers will fail in this case because the rapid solidification of the mixture will bock the mixer so that no homogeneous mixing with the other reactant can take place. Moreover, a controlled heat dissipation from the rapidly solidying mixture will no longer be possible with the potential consequences of local overheating and even hazardous explosions.

A preferred embodiment of the inventive mixing apparatus will be explained in detail in the following with reference to the accompanying schematic drawings in which:

The mixing apparatus which is shown in FIG. 1 and generally identified by 10 comprises an essentially cylindrical mixing tube 12 which extends along its longitudinal axis M. The mixing tube 12 has an inlet 14 and an oppositely arranged outlet 16. In the illustrated embodiment, the inlet area of the mixing tube 12 is conically expanded, while the outlet area is conically tapered.

Two fluid supply nozzles 18 and 20 through which the two liquids to be mixed can be supplied to the mixing tube 12 open into the inlet 14. As can be seen, the two fluid supply nozzles 18 and 20 open into the central area of the mixing tube 12 with respect to the inlet cross sectional area and are slightly inclined relative to the longitudinal centre axis M so that their longitudinal axes F intersect the longitudinal centre axis M in the downstream direction.

Figure 2:
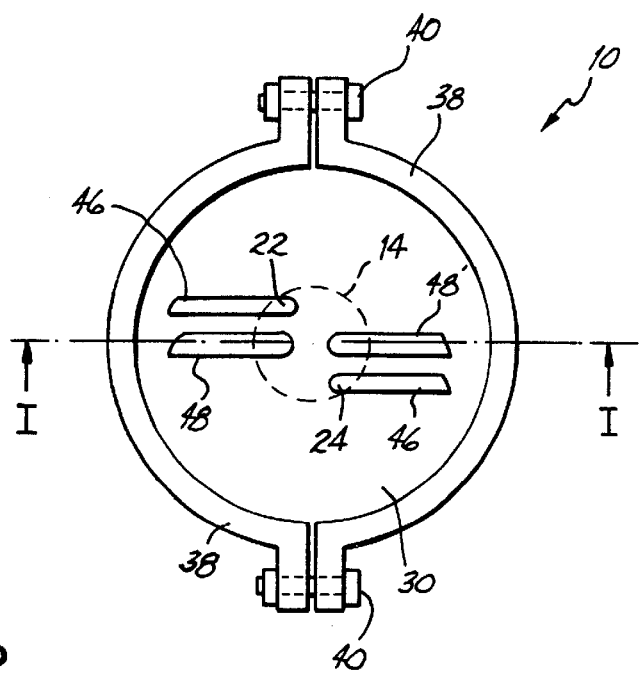
FIG. 2 shows the plan view II—II from FIG. 1.

Two gas supply nozzles 22 and 24 open radially outward (see also FIG. 2) of the two fluid supply nozzles 18 and 20 into the mixing tube inlet 14. Longitudinal axes G of the gas supply nozzles 22 and 24 are inclined in the same manner as the longitudinal axes F with respect to the longitudinal centre axis M of the mixing tube 12, with the angle which is included between each longitudinal axis G and the longitudinal centre axis M ranging from 5° to 60° and preferably from 5° to 30°. For illustrative reasons, the two gas supply nozzles 22, 24 are shown in the sectional plane of FIG. 1. As can be seen from FIG. 2, the openings of the two gas supply nozzles 22 and 24 are equally spaced in a circumferential direction with respect to the mixing tube inlet 14 so that they are arranged diametrically opposite each other.

During operation of the mixing apparatus 10 compressed gas, e.g. pressurized air, is injected into the mixing tube 12 through the gas supply nozzles 22 and 24 in a direction tangential to the longitudinal centre axis M. Thereupon a helical flow is formed in the mixing tube 12 which separates the injected liquids into fine droplets, mixes them homogeneously and transports them towards the mixing tube outlet 16. If a highly exothermal reaction takes place due to the mixing of the two injected liquids, which results in a solid body, the generated reaction heat is dissipated in a controlled manner and a granular material is formed which is ejected from the mixing tube 12 without obstructing it.

As can be seen from FIG. 1, the mixing tube 12 is accommodated in a support plate 26 which is circular here and positively secured by its conically expanded inlet area in a correspondingly shaped recess of the support plate. The right end in FIG. 1 of the mixing tube 12 is aligned with an adjacent end face 28 of the support plate 26. A circular cylindrical nozzle block 30 with the same diameter as the support plate 26 and in which the liquid supply nozzles 18 and 20 as well as the gas supply nozzles 22 and 24 are accommodated or formed, respectively, is placed upon the end face 28.

Both the support plate 26 and the nozzle block 30 are made from a stable, pressure resistant material, e.g. stainless steel. For the purpose of better sealing, a circumferential seal 32 is arranged between the support plate 26 and the nozzle block 30 in the vicinity of the mixing tube inlet 14.

In the shown embodiment the two gas supply nozzles 22 and 24 are directly formed in the material of the nozzle block 30, for example by drilling or by electric discharge machining. The two liquid supply nozzles 18 and 20, however, are designed in the form of separate inserts 34 which are tightly fitted into the nozzle block 30. If the liquids involved are particularly aggressive, only the inserts 34 have to be made from a special high-quality material which is resistant against these media, whereas the nozzle block 30 can be made from a more favourably priced material.

The support plate 26 and the nozzle block 30 are clamped together by means of a circular clamp 36 which in the present embodiment consists of two pieces. The two half shell-type parts 38 (see FIG. 2) of the clamp 36 are connected by means of screws 40. The inner surface of the two clamp parts 38 and the circumferential surfaces of the holding plate 26 and the nozzle block 30 are formed with correspondingly bevelled areas 42 and 44 so that good centering and satisfactory sealing of the support plate 26 and the nozzle block 30 with respect to one another is ensured when the clamp 36 is tightened.

For the connection of the gas and fluid supply lines (not shown) connecting pieces 46 and 48, 48' protrude from the nozzle block 30, to which the corresponding lines can be secured.

What is claimed is:

1. A method for the solidification of a phosphoric acid and sulphuric acid containing solution wherein the solution having a phosphoric acid content of 40 to 70% by weight and a sulphuric acid content of 15–50% by weight is mixed with an alkaline aluminum containing solution with an aluminum content of 1.5 to 20% by weight to achieve a pH between 5–9, thereby producing a solidified mass without further treatment.

2. The method according to claim 1, wherein the alkaline aluminum containing solution contains 10 to 40% by weight alkali hydroxides.

3. A method for treating waste acid and rinse water contaminants from a phosphoric acid and sulphuric acid containing mixture comprising adding aluminum containing alkaline solutions to said phosphoric acid and sulphuric acid containing mixture in an amount sufficient to form solids suitable for deposition in a disposal site.

4. The method of claim 3 wherein aerosols of said contaminants are not formed.

5. The method of claim 3 wherein dusts of said contaminants are not formed.

6. The method of claim 3 wherein said solids have a weight increase of a maximum of 1.5 times a weight of the phosphoric acid containing mixture.

7. A method for conditioning and solidifying solutions containing phosphoric acid and sulphuric acid contaminants comprising adding an alkaline aluminum containing solution to obtain a pH in the range of 5 to 9 of the resulting mixture.

8. The method of claim 7 where said alkaline aluminum containing solution has an aluminum content of 1.5% to 20% by weight.

9. The method of claim 7 where said alkaline aluminum containing solution has an aluminum content of 4% to 10% by weight.

10. The method of claim 7 where a pH in the range of 6–8 of the resulting mixture is obtained.

11. The method of claim 7 where a pH in the range of 7–8 of the resulting mixture is obtained.

12. The method of claim 7 where at least one parameter selected from the group consisting of water content, aluminum content, and phosphoric acid content of the solution to be treated and the resulting mixture determine the pH obtained.

13. The method of claim 12 where a more acidic pH is used to achieve solidification if the solution to be treated and the resulting mixture have a low water content or a high aluminum content in conjunction with a high phosphoric acid content.

14. The method of claim 7 where the phosphoric acid containing solutions range from 10% phosphoric acid by weight to 100% phosphoric acid by weight.

15. The method of claim 7 where the phosphoric acid containing solutions range from 40% phosphoric acid by weight to 70% phosphoric acid by weight.

16. The method of claim 7 where the phosphoric acid containing solutions have an aluminum content in the range of 0% aluminum to 4% aluminum.

17. The method of claim 7 wherein the solutions containing phosphoric acid are used in a metal surface processing process selected from the group consisting of chemical pickling, electrochemical pickling, cleaning, polishing, decontaminating, and combinations thereof.

18. The method of claim 17 wherein metals used in surface processing are selected from the group consisting of aluminum, steel, nickel, copper, beryllium, and combinations thereof.

19. The method of claim 7 wherein the concentration of sulphuric acid ranges from 15% sulphuric acid by weight to 70% sulphuric acid by weight.

20. The method of claim 7 wherein the ratio of phosphoric acid to sulphuric acid is 1:3.

21. The method of claim 7 wherein the alkaline aluminum containing solution in an aqueous solution of alkali hydroxides with a concentration of 1% alkali hydroxides by weight to 60% alkali hydroxides by weight.

22. The method of claim 7 wherein the alkaline aluminum containing solution is an aqueous solution of alkali hydroxides with a concentration of 10% alkali hydroxides by weight to 40% alkali hydroxides by weight.

23. The method of claim 7 wherein aluminum ions are added to the solutions containing phosphoric acid prior to adding said alkaline aluminum containing solution to enhance a water binding capacity of said phosphoric acid and sulphuric acid containing solutions.

24. The method of claim 23 wherein said aluminum ions are selected from the group consisting of calcium aluminate, sodium aluminate, potassium aluminate, and combinations thereof.

25. The method of claim 24 wherein said aluminum ions are added in an amount to saturate said solution.

26. The method of claim 7 wherein said solutions to be treated are first concentrated by water evaporation.

27. The method of claim 26 wherein said water evaporation occurs by exothermal reaction of the reactants.

28. The method of claim 26 wherein a time to achieve said solidifying is selected by controlling a water content of said mixture.

29. The method of claim 26 wherein said solidifying occurs within a period of a few seconds up to half an hour.

30. A method for conditioning and solidifying solutions containing phosphoric acid and sulphuric acid comprising mixing an aluminum containing solution containing aqueous alkali hydroxides in a concentration of 1% to 60% by weight to obtain a pH in the range of 5 to 9.

31. A method for conditioning and solidifying solutions containing phosphoric acid and sulphuric acid comprising mixing an aluminum containing solution containing aqueous alkali hydroxides in a concentration of 10% to 40% by weight to obtain a pH in the range of 5 to 9.

32. A method for transforming waste acid and rinse water contaminants from phosphoric acid and sulphuric acid containing mixtures comprising adding aluminum containing alkaline solutions to said phosphoric acid and sulphuric acid containing mixtures in an amount sufficient to form a viscous mass.

33. The method of claim 32 wherein said viscous mass is deposited in a disposal site.

34. The method of claim 32 wherein said viscous mass is further cured to a solid substance which is deposited in a disposal site.

35. A method for conditioning and solidifying solutions containing phosphoric acid and sulphuric acid comprising mixing alkaline aluminum containing solutions having an aluminum content in the range of 1.5% to 20% by weight with said phosphoric acid and sulphuric acid containing solution having a phosphoric acid content in the range of 40% to 70% phosphoric acid by weight to obtain a pH in the range of 5 to 9.

36. The method of claim 35 wherein said aluminum and acid concentrations are determined by prior testing.

37. The method of claim 35 wherein alkaline earth metal ions are added to said solutions.

* * * * *